United States Patent
Arlitt et al.

(10) Patent No.: US 8,847,418 B2
(45) Date of Patent: Sep. 30, 2014

(54) TIDAL POWER PLANT AND METHOD FOR OPERATING SAID TIDAL POWER PLANT

(75) Inventors: Raphael Arlitt, Ulm (DE); Frank Biskup, Schwabisch Gmund (DE); Jochen Weilepp, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 57 days.

(21) Appl. No.: 13/580,804

(22) PCT Filed: Feb. 22, 2011

(86) PCT No.: PCT/EP2011/000842
§ 371 (c)(1),
(2), (4) Date: Nov. 13, 2012

(87) PCT Pub. No.: WO2011/141074
PCT Pub. Date: Nov. 17, 2011

(65) Prior Publication Data
US 2013/0049362 A1 Feb. 28, 2013

(30) Foreign Application Priority Data
Apr. 16, 2010 (DE) .......................... 10 2010 015 534

(51) Int. Cl.
*F03B 13/10* (2006.01)
*F03B 17/06* (2006.01)
*F03B 3/12* (2006.01)

(52) U.S. Cl.
CPC ............... *F03B 17/061* (2013.01); *F03B 13/10* (2013.01); *Y02E 10/22* (2013.01); *F03B 3/126* (2013.01); *F05B 2260/85* (2013.01); *Y02E 10/28* (2013.01); *Y02E 10/223* (2013.01); *F05B 2210/404* (2013.01)

USPC .............................................. 290/43; 290/54

(58) Field of Classification Search
USPC ......................................... 290/43, 44, 54, 55
See application file for complete search history.

(56) References Cited

U.S. PATENT DOCUMENTS

| | | | |
|---|---|---|---|
| 5,946,909 A * | 9/1999 | Szpur | 60/398 |
| 2004/0101397 A1* | 5/2004 | Godsall et al. | 415/3.1 |
| 2004/0120805 A1* | 6/2004 | Lin | 415/122.1 |
| 2006/0132103 A1* | 6/2006 | Baratto et al. | 322/17 |
| 2006/0229005 A1* | 10/2006 | Gautier et al. | 451/359 |
| 2006/0233639 A1* | 10/2006 | Gentilcore et al. | 415/151 |
| 2008/0075599 A1* | 3/2008 | Miller | 416/182 |
| 2008/0084067 A1* | 4/2008 | Hill | 290/4 R |
| 2008/0219850 A1* | 9/2008 | O'Connor et al. | 416/223 R |
| 2008/0273977 A1* | 11/2008 | Beard | 416/176 |
| 2009/0041584 A1* | 2/2009 | Gray et al. | 416/204 A |

(Continued)

FOREIGN PATENT DOCUMENTS

| | | |
|---|---|---|
| DE | 10 2008 023 050 | 11/2009 |
| DE | 10 2008 053 732 | 1/2010 |

(Continued)

*Primary Examiner* — Tulsidas C Patel
*Assistant Examiner* — Charles Reid, Jr.
(74) *Attorney, Agent, or Firm* — Farjami & Farjami LLP

(57) ABSTRACT

The invention relates to a flow power plant, comprising a water turbine having torsionally rigid rotor blades, a drive train connected to the water turbine, which at least indirectly drives an electric generator and is characterized in that at inflow speeds v for which the flow power plant is designed, the water turbine is configured to be non-auto-restarting for tip speed ratios $\lambda$ below a predetermined auto-restart tip speed ratio $\lambda s$ where $\lambda s \geq 1$.

16 Claims, 4 Drawing Sheets

(56) References Cited

U.S. PATENT DOCUMENTS

2009/0295159 A1* 12/2009 Johnson et al. ................. 290/44
2010/0060001 A1*  3/2010 Gabrys ........................... 290/44
2010/0283251 A1* 11/2010 Reynolds ........................ 290/54
2010/0295309 A1* 11/2010 Holstein et al. ................ 290/52

FOREIGN PATENT DOCUMENTS

| GB | 1 473 746 | 5/1977 |
| GB | 2461265 | 12/2009 |
| WO | WO 2009/062262 | 5/2009 |
| WO | WO 2009/076726 | 6/2009 |

* cited by examiner

TIDAL POWER PLANT AND METHOD FOR OPERATING SAID TIDAL POWER PLANT

This is a U.S. national phase application, which is based on, and claims priority from, PCT application Serial No. PCT/EP2011/000842, filed Feb. 22, 2011, which claims priority from foreign application Serial No. 10 2010 015 534.9, filed Apr. 16, 2010, in Germany.

The invention relates to a flow power plant, in particular for obtaining energy from a tidal flow, as well as a method for operation thereof.

Without damming structures, flow power plants operating in a free-standing manner in a surrounding flow are particularly suitable for obtaining energy from a tidal flow. Alternatively, a use in flowing water is possible, possibly to generate power at partially back-built barrages. Generic flow power plants comprise a water turbine in the form of a rotor which revolves on a chassis which is floating or supported on the bottom of the body of water by means of a support structure.

The free-standing plant design allows the construction of tidal energy parks at locations which would be unsuitable for the construction of comprehensive barrages. However, plants of this type must be designed for a out-of-water service access at the longest possible maintenance intervals without any structural apparatus. Furthermore, a plant which is as robust as possible must be provided for use in the sea in order to withstand loading peaks under stormy weather conditions.

Furthermore, precautions must be taken in order to be able to bring the plant safely to a standstill at any time and to be able to secure the plant at a standstill. This is necessary, for example, when the chassis with the water turbine must be raised to carry out maintenance. As a solution, it has been proposed to fix the rotor blades of the water turbine rotatably on a hub and to turn the rotor blades into the vane position for braking the plant. In addition, generic plants are typically provided with a locking brake in order to be able to ensure that the rotors can be stopped under all circumstances.

Rotatably hinged rotor blades certainly improve the start-up behaviour of the water turbine but they result in an expensive construction. This is in turn associated with an increased probability of failure of the plant. Locking brakes for the water turbine or for other components of the rotating unit also form additional components which increase the complexity of the plant, for which trigger systems or energy supply systems need to be provided. In particular for a braking mechanism that is only activated occasionally, there is the problem of maritime growth or corrosion, particularly in a salt water environment.

It is the object of the invention to overcome the aforesaid disadvantages of the prior art and provide a flow power plant, in particular a tidal power plant and a method for operation thereof, that ensures a safe stopping of the water turbine for a constructively simplified plant.

The object forming the basis of the invention is solved by the features of the independent claims. Advantageous embodiments are obtained from the subclaims.

The invention starts from a water turbine for a generic free-standing flow power plant which is configured in the form of a rotor with torsionally rigid rotor blades. Various configurations are feasible for this, possibly a fastening of the rotor blades on a hub, where the rotor blades extend radially outwards. This includes the possibility of a sweep of the rotor blades in the forward or backward direction. An outer supporting ring and radially inwardly directed rotor blades are feasible as an alternative configuration. Furthermore, the rotor is connected to a drive train which at least indirectly drives an electric generator. A direct drive with a coupling of the water turbine and the generator armature which is rigid in respect of rotational speed is particularly preferred. Alternatively, the electric generator can be connected indirectly to the water turbine via a mechanical or hydrodynamic transmission or an indirect transmission of force is accomplished by means of an interposed hydraulic circuit.

For safe shutdown, the water turbine of a plant according to the invention is designed to be non-auto-restarting over a broad operating range, where the inhibition of auto-restarting occurs for tip speed ratios $\lambda$ below a constructively determined auto-restart tip speed ratio $\lambda s$ where $\lambda s \geq 1$. The tip speed ratio $\lambda$ is defined as the ratio of the circulation speed u, i.e. the tangential speed at the rotor blade tips of the water turbine relative to the inflow speed v ($\lambda = u/v$), where a speed of the ambient flow averaged in terms of energy over the rotor surface is assumed for the inflow speed.

The auto-restart tip speed ratio $\lambda s$ is defined in the present case as the highest tip speed ratio $\lambda$ for which, at an inflow speed v up to a specified maximum inflow speed vmax to be expected theoretically at the selected location for which the plant is designed, the sum of the braking forces in the bearings of the wind turbine and the other rotating components in the drive train is greater than the drive moment generated by the water turbine. The electromagnetic moment generated in the electric generator is not taken into account here.

An even higher safety margin for shutting down a plant according to the invention is particularly preferred with a specification for the auto-restart tip speed ratio $\lambda s$ with $\lambda s \geq 1.5$ and particularly preferably $\lambda s \geq 2$. The aforesaid lower limits for the auto-restart tip speed ratio $\lambda s$ relate to a plant which is controlled in a power-optimal manner for a tip speed ratio $\lambda$ in the range of $3 \leq \lambda \leq 6$. For a plant design differing from this, the lower limit selected according to the invention for the auto-restart tip speed ratio $\lambda s$ starting from an associated power-optimal tip speed ratio $\lambda opt$ is specified by a lower limit with $\lambda s \geq \lambda opt/6$, preferably $\lambda s \geq \lambda opt/3$, and particularly preferably $\lambda s \geq \lambda opt/2$.

For a preferred embodiment of the invention the water turbine is configured so that negative power coefficients cp are present in the range of low tip speed ratios $\lambda$ up to a zero-crossing tip speed ratio $\lambda 0$. Bearing losses in the drive train are taken into account to determine the auto-restart tip speed ratio $\lambda s$, accordingly $\lambda s$ is somewhat greater than $\lambda 0$. For a particularly advantageous embodiment of the invention the water turbine is configured so that for the zero-crossing tip speed ratio $\lambda 0$ the condition $\lambda 0 \geq 1$ and preferably $\lambda 0 \geq 1.5$ is satisfied.

When starting up by means of the motor-driven electric generator, the flow power plant according to the invention must run through a broad tip speed ratio range up to the auto-restart tip speed ratio $\lambda s$ until the plant is exclusively accelerated by the driving movement of the water turbine itself and runs into the power-optimal operating range. The extended range of circulation speed without auto-restarting accordingly ensures that the water turbine does not start up in an uncontrolled manner for the maximum inflow speed vmax to be taken into account at the selected site. Accordingly, it is not necessary to use a separate brake for fixing the water turbine so that a constructively simplified plant concept results.

In the event that an operating plant is to be brought to a standstill, the braking process is initiated by slowing the circulation speed u of the water turbine and reducing the tip speed ratio $\lambda$ below the predetermined auto-restart tip speed ratio $\lambda s$. A braking system designed for short-term operation can be used for this purpose. Another possibility consists in bringing about the braking moment by enlarging the generator moment produced by the electric generator. Additionally or alternatively, the desired slowing of the circulation speed u is brought about by a short-term increase in the braking bearing moments. For this purpose, a change in the bearing characteristics by an intervention in the bearing gap can be considered when using friction bearings for the water turbine. The measures taken for the braking must not act permanently here. They are merely used to bring the tip speed ratio $\lambda$ of the water turbine below the predetermined auto-restart tip speed ratio $\lambda s$. The further braking phase until the final stoppage is then obtained automatically on the basis of the non-auto-restarting characteristic of the water turbine.

A water turbine configured in rotor form is preferably used, the rotor blades being configured with regard to the installation angle and the profile behaviour such that the specification according to the invention for the auto-restart tip speed ratio $\lambda s$ where $\lambda s \geq 1$ is achieved. For a preferred embodiment of the invention, at least one locally delimited subsection of the longitudinal extension of the rotor blades is designed to ensure the extended inhibition of auto-restarting. In particular, the radial inner sections which are weighted more slowly when slow running can be considered for this purpose, whereas radially outer sections are particularly designed for an advantageous fast running in the range of the optimal tip speed ratios $\lambda opt$. In addition to the first radial section of the rotor blade for adaptation in the range of low tip speed ratios where $\lambda \leq \lambda s$, accordingly at least a second radial section is provided for which the profile behaviour and the installation angle are selected to achieve a highest possible efficiency in the range $\lambda > \lambda s$.

For a further embodiment of the invention, the extended inhibition of auto-restarting of the water turbine is combined with a bidirectional inflow characteristic. In particular, point-symmetrical profiles having curvature, accordingly profiles having a reflexed trailing edge-shaped skeletal line are used for this purpose. These can advantageously be selected so that in slow running with $\lambda \leq \lambda 0$ the desired negative power coefficients $cp \leq 0$ results, and tip speed ratios $\lambda$ in the operating range around $\lambda opt$ lead to an acceptable efficiency for an inflow from two oppositely directed principal flow directions.

The invention is explained in further detail hereinafter with reference to exemplary embodiments and in conjunction with the figures. In these the following is shown in detail:

Figure 1:
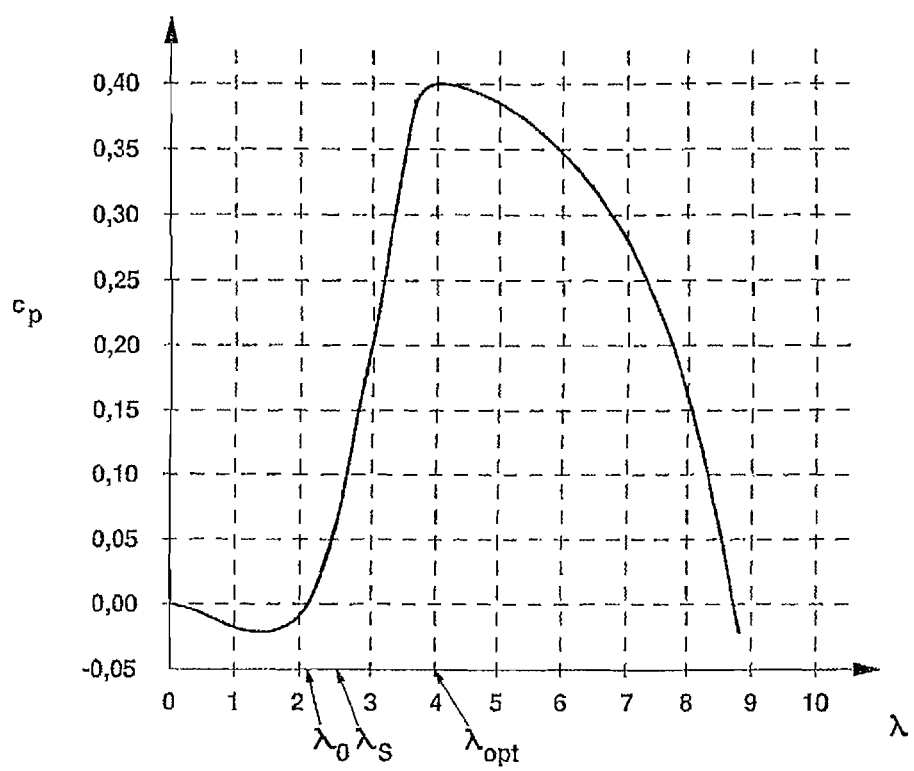
FIG. 1 shows a characteristic behaviour of the power coefficient cp as a function of the tip speed ratio $\lambda$ for a flow power plant according to the invention.

FIG. 1 shows for a preferred exemplary embodiment of the invention the behaviour of the power coefficient cp of the water turbine as a function of the tip speed ratio $\lambda$. A plant design with a power-optimal tip speed ratio $\lambda opt=4$ is selected. In order to ensure an extended inhibition of auto-restarting, the water turbine is configured so that for low tip speed ratios $\lambda$ the power coefficient cp is less than zero. The range where $cp \leq 0$ extends as far as the zero-crossing tip speed ratio $\lambda 0$ where $\lambda 0$ for the present preferred exemplary embodiment is selected as $\lambda 0 > 2$. Furthermore as far as the auto-restart tip speed ratio $\lambda s$ which is selected to be $\lambda s > 2$ in the present case, the condition is satisfied that for all inflow speeds v for which the plant is designed, the braking moment acting on the rotating unit is greater than the driving moment produced by the water turbine. This is illustrated hereinafter with reference to FIG. 2. This shows the drive power P generated by the water turbine as a function of the inflow speed v. Power-optimal plant operation is achieved in this case for a power-optimal tip speed ratio $\lambda opt$ which for the present exemplary embodiment lies at $\lambda=4$. In this range the plant is controlled in normal operation until the nominal power Pn is reached and a power derating takes place. For this purpose, a power limitation can be executed by operating in the tip speed ratio range $\lambda > \lambda opt$.

Figure 2:
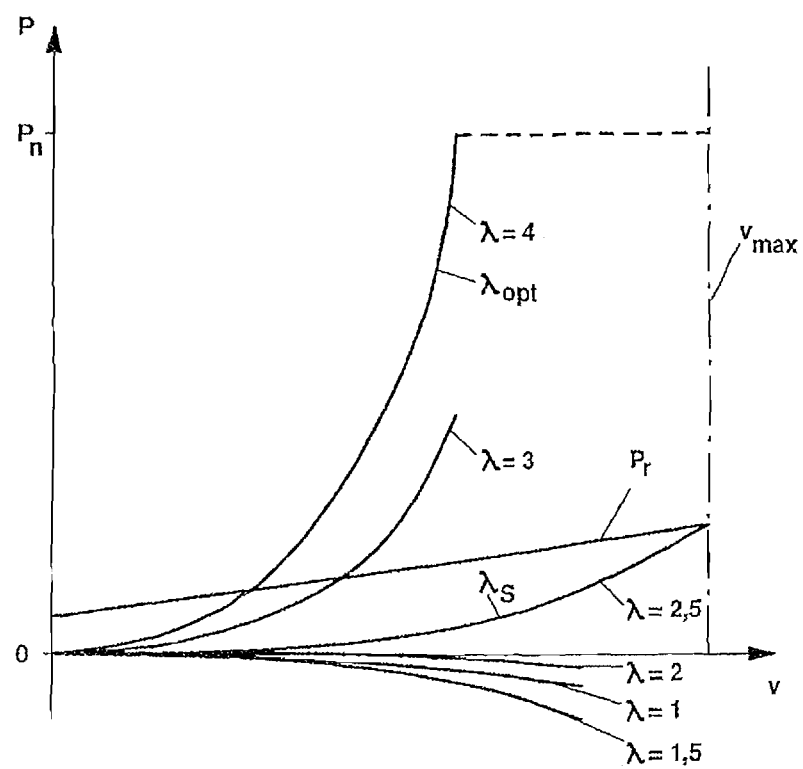
FIG. 2 shows for a plant with a power coefficient characteristic according to FIG. 1 the drive power P generated by the water turbine as a function of the inflow speed v for variously selected tip speed ratios $\lambda$ and the speed-dependent braking power loss Pr in the bearings.

FIG. 2 further shows the behaviour of the power loss Pr produced in the bearings of the rotating unit, which increases with increasing inflow speed v. For illustration the power loss Pr is shown exaggerated since the power losses which typically occur lie in the range of <2% relative to the nominal power Pn.

For low tip speed ratios with $\lambda \leq 2$, negative power coefficients cp are present for the preferred embodiment according to FIG. 1. For the present exemplary embodiment assuming a power loss Pr shown exaggerated for illustration, the range of auto-restart inhibition extends up to a tip speed ratio of $\lambda=2.5$, which corresponds to the auto-restart tip speed ratio $\lambda s$. For these it holds that for all inflow speeds v below the theoretically predicted maximum inflow speed vmax, the condition is satisfied that the drive power P generated by the water turbine is not greater than the power loss Pr in the bearings.

Figure 3:
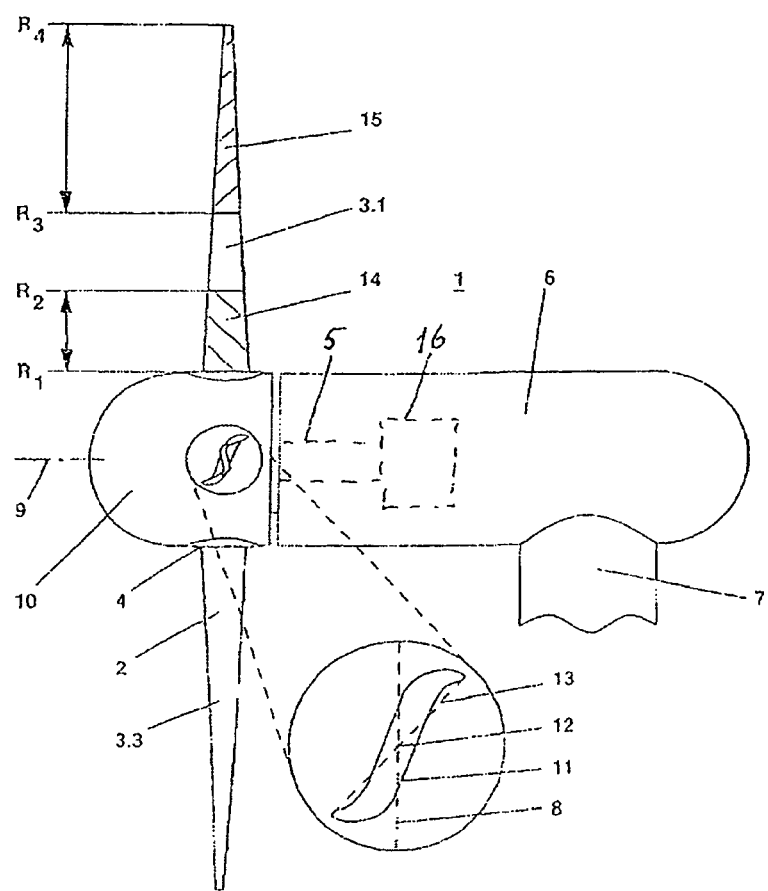
FIG. 3 shows one embodiment of the invention with a locally limited adaptation of the rotor blades of the water turbine to achieve an extended inhibition of auto-restarting.

FIG. 3 shows in a schematically simplified manner a tidal power plant 1 according to the invention. This comprises a water turbine 2 with rotor blades 3.1, 3.2 (not shown), 3.3, fixed torsionally rigidly to a hub 4, which substantially point radially outwards for the embodiment shown. A drive train 5 adjoins the hub 4. The other components of the rotating unit 10 and the associated bearing components and the electric generator 16 are not shown in detail. These are typically accommodated in the chassis 6 which rests on a support structure 7.

Figure 4:
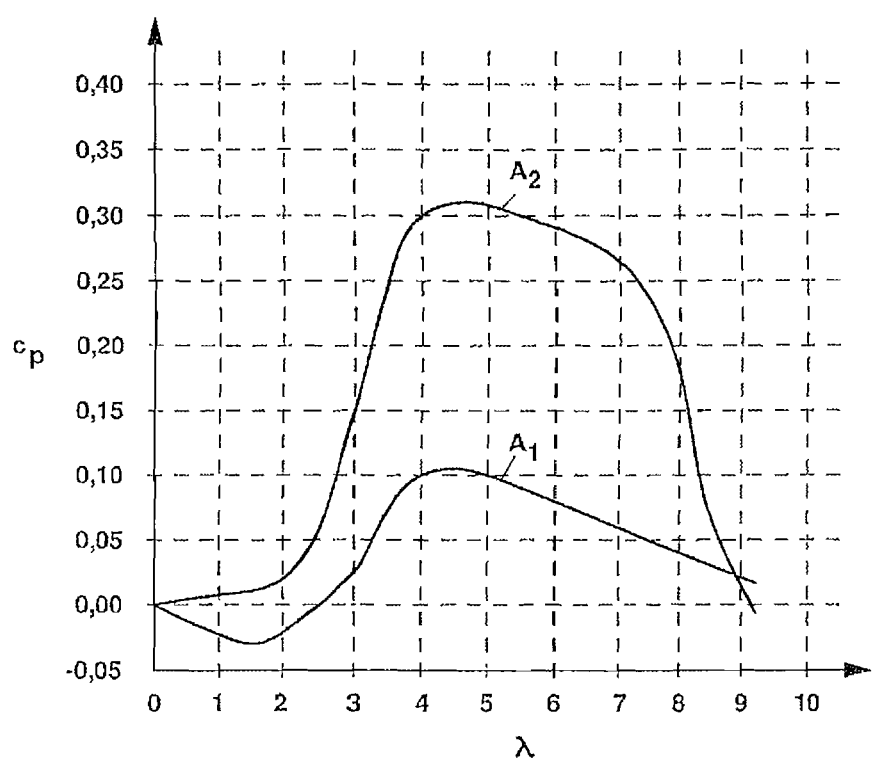
FIG. 4 shows the behaviour of the regionally assigned power coefficient for the radial sections of the water turbine shown in FIG. 3.

For the embodiment of the invention shown in FIG. 3, the radially inner regions of the rotor blades 3.1, 3.2 (not shown), 3.3 are responsible for the restart inhibition selected according to the invention. For this purpose a first radial section 14 is fixed, which, as shown as an example for the rotor blade 3.1, extends from a first radius R1 to a larger second radius R2. For a second radial section 15 which extends from the third radius R3 where R3>R2 as far as a larger fourth radius R4, the substantial contribution to the power coefficient cp is obtained for tip speed ratios $\lambda > \lambda s$. The contributions of the first radial section 14 and the second radial section 15 to the power coefficient cp are sketched in FIG. 4. This shows a first regionally assigned power coefficient A1, which is assigned to the first radial section 14. This exhibits a defined region with negative power coefficients cp as far as a tip speed ratio $\lambda=2.5$. Accordingly, the first radial section 14 brakes the water turbine in the area of small tip speed ratios $\lambda$. In this operating range the positive contribution does not extend through the second regionally assigned power coefficient A2, which reflects the contribution of the second radial section 15 in order to bring about an auto-restart of the water turbine. The entire power coefficient cp is determined for larger tip speed ratios $\lambda$ substantially by the behaviour of the second regionally assigned power coefficient A2.

FIG. 3 shows an enlarged view of a near-hub profile section 11 for the rotor blade 3.2 (not shown) which falls in the first radial section 14 between the first radius R1 and the second radius R2. The selected profile provided with bidirectional inflow has a reflexed trailing edge for the skeletal line not shown in detail. The profile is point-symmetric here with respect to the symmetry point 12. Through the choice of profile and installation angle behaviour the power coefficient characteristic can be determined to ensure inhibition of auto-restarting. FIG. 3 shows the angular position of the profile chord 13 to the plane of rotation 8 where the plane of rotation 8 is determined by the axis of rotation 9 of the rotating unit 10 as surface normal and by the position of the base points of the rotor blades 3.1, 3.2 (not shown), 3.3 on the hub 4. This results in a reduction of the installation angle to the profile characteristic for which the profile polar in the inflow angle range of 80$o$-90$o$ has a negative lift coefficient.

Further embodiment of the invention are obtained from the following protective claims.

REFERENCE LIST

1 Tidal power plant
2 Water turbine
3.1, 3.2 (not shown), 3.3 Rotor blades
4 Hub
5 Drive train
6 Chassis
7 Support structure
8 Plane of rotation
9 Axis of rotation
10 Rotating unit
11 Profile section
12 Symmetry point
13 Profile chord
14 First radial section
15 Second radial section
A1 First regionally assigned power coefficient
A2 Second regionally assigned power coefficient
u Circulation speed
v Inflow speed
vmax Maximum inflow speed
cp Power coefficient
$\lambda$ Tip speed ratio
$\lambda$opt Power-optimal tip speed ratio
$\lambda$S Auto-restart tip speed ratio
$\lambda$0 Zero-crossing tip speed ratio
P Drive power
Pn Nominal power
Pr Power loss

The invention claimed is:

1. A flow power plant comprising
a water turbine having torsionally rigid rotor blades;
a drive train connected to the water turbine, wherein the drive train at least indirectly drives an electric generator;
wherein at inflow speeds, the water turbine is configured to be non-auto-restarting for tip speed ratios $\lambda$ below a predetermined auto-restart tip speed ratio $\lambda$s where $\lambda s \geq 1$, wherein $\lambda$ is defined as a ratio of a circulation speed relative to an inflow speed;
wherein the water turbine has a negative power coefficient up to a zero-crossing tip speed ratio $\lambda$0, wherein the zero-crossing tip speed ratio $\lambda$0 is smaller than the auto-restart tip speed ratio $\lambda$s; and
wherein the rotor blades of the water turbine each comprises a first radial section and a second radial section, wherein a profile and installation angle behaviour for the first radial section is adapted to tip speed ratios $\lambda$ below the auto-restart tip speed ratio $\lambda$s and for the second radial section is adapted to tip speed ratios $\lambda$ above the auto-restart tip speed ratio $\lambda$s.

2. The flow power plant according to claim 1, wherein the auto-restart tip speed ratio $\lambda s \geq 1.5$.

3. The flow power plant according to claim 1, wherein starting from a power-optimal tip speed ratio $\lambda$opt of the water turbine, the auto-restart tip speed ratio $\lambda s \geq \lambda opt/6$.

4. The flow power plant according to claim 2, wherein starting from a power-optimal tip speed ratio $\lambda$opt of the water turbine, the auto-restart tip speed ratio $\lambda s \geq \lambda opt/6$.

5. The flow power plant according to claim 1, wherein the zero-crossing tip speed ratio $\lambda 0 \geq 1$.

6. The flow power plant according claim 1, the water turbine a ports a bidirectional flow.

7. The flow power plant according to claim 6, wherein the turbine blades of the water turbine each has a curved, point-symmetrical profile at least over a part of a radial extension of each of the turbine blades.

8. The flow power plant according to claim 1, wherein the auto-restart tip speed ratio $\lambda s \geq 2$.

9. The flow power plant according to claim 1, wherein starting from a power-optimal tip speed ratio $\lambda$opt of the water turbine, the auto-restart tip speed ratio $\lambda s \geq \lambda opt/3$.

10. The flow power plant according to claim 1, wherein starting from a power-optimal tip speed ratio $\lambda$opt of the water turbine, the auto-restart tip speed ratio $\lambda s \geq \lambda opt/2$.

11. The flow power plant according to claim 2, wherein starting from a power-optimal tip speed ratio $\lambda$opt of the water turbine, the auto-restart tip speed ratio $\lambda s \geq \lambda opt/3$.

12. The flow power plant according to claim 2, wherein starting from a power-optimal tip speed ratio $\lambda$opt of the water turbine, the auto-restart tip speed ratio $\lambda s \geq \lambda opt/2$.

13. The flow power plant according to claim 8, wherein starting from a power-optimal tip speed ratio $\lambda$opt of the water turbine, the auto-restart tip speed ratio $\lambda s \geq \lambda opt/6$.

14. The flow power plant according to claim 13, wherein starting from a power-optimal tip speed ratio $\lambda$opt of the water turbine, the auto-restart tip speed ratio $\lambda s \geq \lambda opt/3$.

15. The flow power plant according to claim 13, wherein starting from a power-optimal tip speed ratio $\lambda$opt of the water turbine, the auto-restart tip speed ratio $\lambda s \geq \lambda opt/2$.

16. The flow power plant according to claim 1, wherein the zero-crossing tip speed ratio $\lambda 0 \geq 1.5$.

\* \* \* \* \*